April 6, 1965 J. J. HICKEY 3,177,390

IMAGE CONVERTER TUBE, INCLUDING FOCUSSING ELECTRODE DECOUPLING CAPACITANCE

Filed Oct. 8, 1962

JOHN J. HICKEY

INVENTOR

BY Jerry A. Dinardo

AGENT

United States Patent Office 3,177,390
Patented Apr. 6, 1965

3,177,390
IMAGE CONVERTER TUBE, INCLUDING FOCUSSING ELECTRODE DECOUPLING CAPACITANCE

John J. Hickey, Hawthorne, Calif., assignor, by mesne assignments, to Thompson Ramo Wooldridge Inc., Cleveland, Ohio, a corporation of Ohio Filed Oct. 8, 1962, Ser. No. 228,948
8 Claims. (Cl. 313—99)

Figure 1:
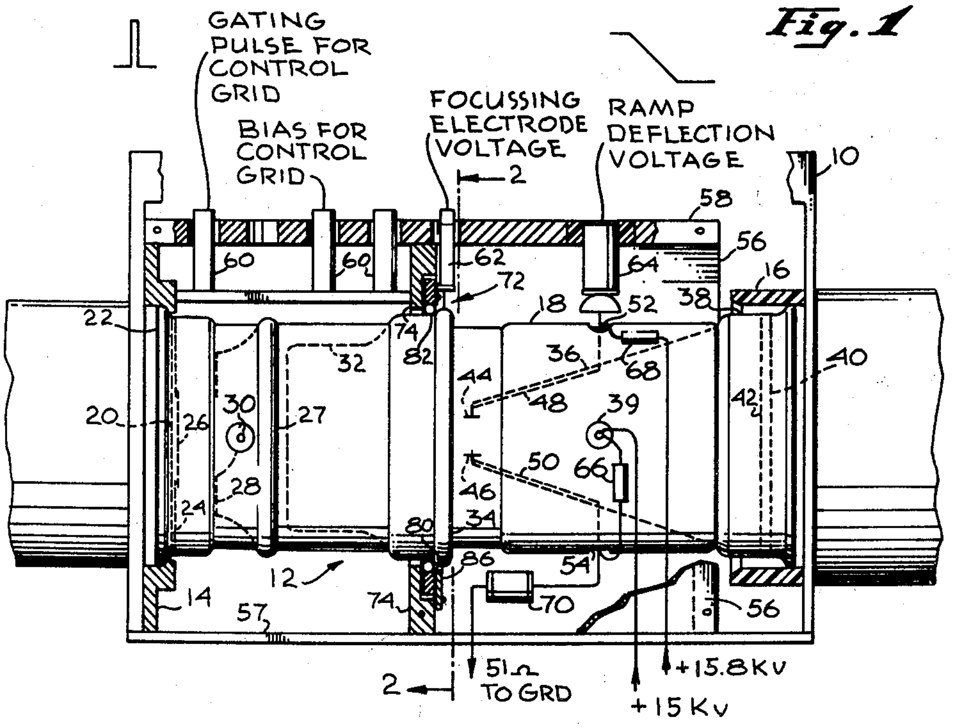

This invention relates to improvements in electronic camera systems employing electrostatic type image converter tubes and particularly to means for eliminating electrostatic coupling of signals between the tube elements.

One type of electronic camera system for photographing ultrahigh speed luminous transient phenomena employs an electrostatically operated image converter tube. The image converter tube serves both as a high speed electronic shutter and as a means for amplifying the light image being photographed. The image converter tube comprises a photocathode for converting the light image into a corresponding electron image, a control grid for gating the electron image, a generally cylindrical focussing electrode for electrostatically focussing the electron image onto a fluoroescent screen, a conical accelerating electrode for accelerating the electron image towards the fluorescent screen, and a pair of electrostatic deflection plates for moving the electron image across the fluorescent screen. The interelectrode capacitances of the image converter tube present serious coupling problems when extremely fast rise-time gating pulses are applied to the control grid. The fast rise-time pulse is coupled through the interelectrode capacities so as to shock excite the focussing and deflection circuits into undesired oscillations. These spurious oscillations are particularly objectionable when they appear superimposed on a linear ramp voltage applied to the deflection plates during streak operation of the image converter tube.

Accordingly, an important object of this invention is to eliminate spurious oscillations from the focussing and deflection circuits of an image converter tube of the kind described.

A further object is to prevent gating pulses that are applied to the control grid of an image converter tube from coupling to the deflection plates thereof.

The foregoing and other objects are realized according to the invention through the provision of a capacitor assembly mounted close to and distributed around the entire periphery of the cylindrical focussing electrode and forming therefor a decoupling capacitor of relatively large capacitance value. A metallic enclosure surrounding the portion of the image converter tube between the deflection plates and the photocathode and conductively connected to a grounding element of the capacitor assembly and to the photocathode serves as a low inductance ground connection between the capacitor assembly and the photocathode. The combined effect of the capacitor assembly and the metallic enclosure is to provide an effective electrostatic shield between the control grid and deflection plates so that gating pulses applied to the control grid will not be coupled to the deflection circuits.

Figure 2:
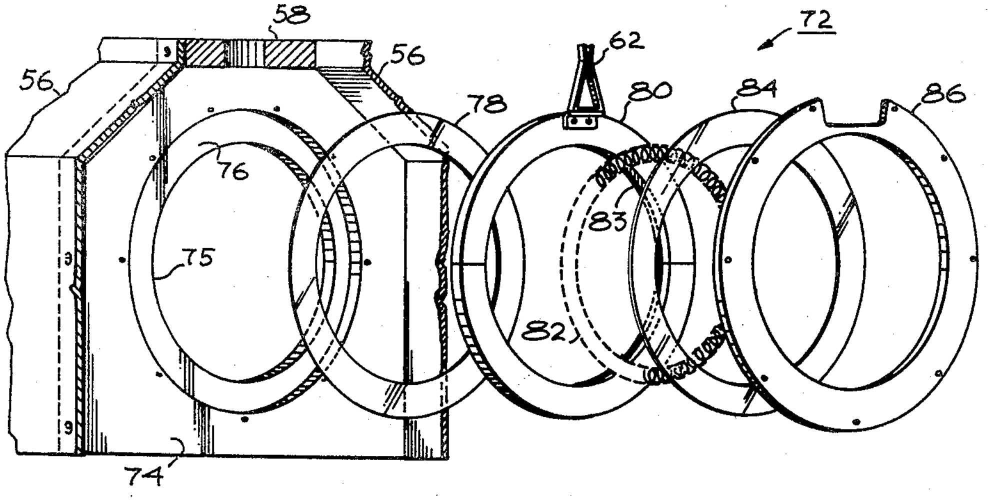

In the drawing:

FIG. 1 is a partial elevation view partly in section showing an image converter camera employing a decoupling capacitor according to the invention; and FIG. 2 is an exploded view showing the detailed construction of the decoupling capacitor.

Referring to FIG. 1, there is shown a metal cabinet 10 for housing an image converter camera tube 12. For simplicity, certain other components used in conjunction with the camera tube 12 for photographing high speed luminous transient phenomena are omitted. These components may include, for example, an input lens system for focussing the incoming light image onto the photocathode of the camera tube and an output lens system and photographic film for projecting and recording the amplified light image appearing on the fluorescent screen of the camera tube.

The camera tube 12 is supported at one end by a metallic support member 14 and at the opposite end by an insulating support member 16. The envelope 18 of the camera tube 12 is closed at one end thereof by a transparent window 20, made of glass, for example. The window 20 is sealed to a metallic flange 22 that forms a part of the envelope structure. A ring-like conductive coating 24 is disposed on the inside surface of the window 20, with the peripheral edges of the coating in contact with the metallic flange 22. On the central portion of the inside surface of the window 20 is a photoemissive coating or photocathode 26 in peripheral contact with the ring-like conductive coating 24. The metallic flange 22 provides external connection to the photocathode 26.

Mounted on a flange 27 adjacent to the photocathode 26 is a wire grid 28 that serves as a control grid for gating the electrons emitted from the photocathode 26. External connection to the control grid 28 is made through a small cavity metal cap 30 recessed in the tube envelope 18. A cylindrical focussing electrode 32 is mounted with one end adjacent to the control grid 28 and the other end mounted in a metal flange 34 sealed to adjacent envelope portions. The metal flange 34 provides external connection to the focussing electrode 32.

Adjacent to the focussing electrode 32 is a conical accelerating anode 36 which terminates in a metal flange 38 sealed to the end of the envelope 18. A recessed metal cap 39 sealed in the envelope 18 provides external connection to the anode 36. Inside the flange 38 and closing the end of the envelope 18 is a transparent window 40. The inside surface of the window 40 is coated with a fluorescent screen 42 which is conductively connected to the flange 38 to maintain it at the same potential as the anode 36.

A pair of deflection plates 44 and 46 are mounted within the anode 36 near the smaller end thereof. The deflection plates 44 and 46 are insulatingly supported in the wall of anode 36 and connected through leads 48 and 50 to recessed metal caps 52 and 54 sealed in the envelope 18.

A metal enclosure 56 is secured to the base 57 of the cabinet 10 and to the metal support member 14 surrounds that portion of the envelope 18 including the photocathode 26 and the deflection plates 44 and 46. The metal enclosure 56 includes a metal block 58 extending across the top thereof for locating coaxial cable connectors 60, spring clip connector 62, and associated cables, not shown, which supply the operating voltages for the camera tube 12. Typical voltages supplied to the tube 12 include −110 volt bias for the control grid 30, a 300 volt positive direct current rectangular gating pulse for the control grid 30, +1.4 kilovolts to the focussing electrode 32, a negative 3 kilovolt linear ramp deflection voltage through a capacitor 64 to the upper deflection plate 44. The photocathode 26 is grounded to the cabinet 10 through the metal support member 14. A positive direct current voltage of 15 kilovolts is applied to the anode 36 by way of metal cap 39, and through a 10 megohm resistor 66 to the lower deflection plate 46 by way of metal cap 54. A positive direct current voltage of 15.8 kilovolts is applied through a 10 megohm resistor 68 to the upper deflection plate 44 by way of metal cap 52. A capacitor 70 is connected between the lower deflection plate 46 by way of metal cap 54 and ground through a 51 ohm resistor, not shown, to decouple the ramp voltage, applied to the upper deflection plate 44, from the lower deflection plate 46.

In accordance with the invention, a capacitor assembly 72 is mounted around the periphery of the flange 34 of the focussing electrode 32. Referring now to FIG. 2, the capacitor assembly 72 includes a rigid metal supporting member 74 connected to the metal enclosure 56. The supporting member 74 is provided with an opening 75 having annular recess 76 in which the following elements are assembled in the order named: a thin annular disk 78 of dielectric material, such as .003 inch thick polyethylene terephthalate; a split annular disk 80 of metal surrounding the metal flange 34 of the focussing electrode 32 and making tight contact therewith through a copper spring 82 recessed in a V-groove 83 in the inner periphery of said split disk 80; a second annular disk 84 of dielectric material, and a metal clamping plate 86 clamping the aforementioned parts rigidly together and against the supporting member 74. The spring clip 62 is fastened to the split disk 80 and provides means for receiving a plug-type connector through which voltage can be applied to the focussing electrode 32. The clip 62 is mounted to avoid contact with the support member 74 and the clamping plate 86. The capacitor assembly 72 forms a double plate capacitor of relatively high capacitance value, with the split disk 80 forming the high voltage plate, and the supporting member 74 and the clamping plate 86 forming the two low voltage or grounded plates. Preferably the supporting member 74, the split disk 80 and clamping plate 86 are made of aluminum, as are the mounting block 58, metal enclosure 56 and cabinet 10. The capacitor assembly 72 forms a decoupling capacitor which is connected between the focussing electrode 32 and the photocathode 26 through a low inductance connection provided by the metal enclosure 56. The metal enclosure 56, incidentally, serves to prevent external light from reaching the camera tube 12 and interfering with the operation thereof. The capacitor assembly 72 and the low inductance connection effectively shield the deflection plates 44 and 46 and their circuits from the gating pulses that are applied to the control grid 28 by by-passing to ground a major portion of the gating pulse that couples to the focussing electrode 32 through the interelectrode capacitance between the control grid 28 and the focussing electrode 32. Because of its unique construction, the capacitance of the capacitor assembly is about 400 times that of the interelectrode capacitance between the control grid 28 and the focussing electrode 32, thereby eliminating practically all spurious oscillations in the deflection circuits which formerly were introduced by the gating pulse through the interelectrode capacitances.

The embodiments of the invention in which an exclusive property or privilege is claimed are defined as follows:

1. An electronic camera comprising:

an image converter tube provided with a photocathode, a control grid, a cylindrical focussing electrode, and deflection plates, mounted in spaced apart relation;

a generally circular capacitor assembly mounted closely adjacent to said focussing electrode and including at least two dielectrically spaced conductive elements;

means conductively connecting one of said conductive elements around the entire periphery of said focussing electrode;

and means providing a low inductance connection between the other conductive element and said photocathode, said last mentioned means including an electrically conductive enclosure surrounding said tube in a region extending between said photocathode and said focussing electrode.

2. The invention according to claim 1, wherein said capacitor assembly forms a double plate capacitor.

3. The invention according to claim 1, wherein said capacitor assembly includes a metal supporting member provided with an opening having an annular recess, a first dielectric annular disk, an annular metal disk, a second dielectric annular disk mounted in said annular recess in that order;

an annular metal plate mounted on said supporting member and holding said disks firmly in said recess;

and means forming a conductive connection between said annular metal disk and said focussing electrode.

4. An electronic camera comprising:

an image converter tube including an envelope, a photocathode, a cylindrical focussing electrode, and deflection plates mounted in that order within said envelope in spaced apart relation, said focussing electrode being provided with an annular flange extending without said envelope;

a generally annular capacitor assembly mounted closely adjacent to said focussing electrode and including at least two dielectrically spaced conductive elements;

means conductively connecting one of said conductive elements around the entire periphery of said annular flange;

and means forming a low inductance connection between the other conductive element and said photocathode.

5. The invention according to claim 4, wherein said low inductance connection means comprises a metal enclosure surrounding said tube in a region extending between said photocathode and said focussing electrode.

6. The invention according to claim 4, wherein said capacitor assembly includes a first dielectric annular disk, a split metal annular disk, and a second dielectric annular disk sandwiched between two metal members;

the inner periphery of said split annular disk and the outer periphery of the annular flange of said focussing electrode being conductively connected.

7. The invention according to claim 6 and characterized further in that the inner periphery of said split annular disk is formed with an annular groove;

and further including a conductive spring disposed in said groove and forming a conductive connection between said annular flange and said split annular disk.

8. An electronic camera, comprising:

an image converter tube provided with a photocathode, a control grid, a cylindrical focussing electrode and deflection plates, mounted in spaced apart relation;

a generally annular capacitor assembly mounted closely adjacent to the periphery of said focussing electrode, said capacitor assembly including at least two dielectrically spaced annular conductive disk-like elements, and means forming low inductance connections between one of said capacitor elements and said focussing electrode and between the other capacitor element and said photocathode;

said capacitor assembly having a substantially greater capacitance value than the interelectrode capacitance between said control grid and said focussing electrode.

No references cited.

GEORGE N. WESTBY, *Primary Examiner.*

DAVID J. GALVIN, *Examiner.*